(12) United States Patent
Haider et al.

(10) Patent No.: US 7,300,961 B2
(45) Date of Patent: Nov. 27, 2007

(54) POLYOL COMPOSITIONS USEFUL FOR PREPARING DIMENSIONALLY STABLE, LOW DENSITY WATER-BLOWN RIGID FOAMS AND THE PROCESSES RELATED THERETO

(75) Inventors: Karl W. Haider, Hurricane, WV (US); David D. Steppan, Gibsonia, PA (US); Michael E. McGregor, Pittsburgh, PA (US); Kerry A. Ingold, Pittsburgh, PA (US); Vincent M. Mautino, Finleyville, PA (US); Michael A. Dobransky, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 29 days.

(21) Appl. No.: 10/178,143

(22) Filed: Jun. 24, 2002

(65) Prior Publication Data

US 2003/0236314 A1    Dec. 25, 2003

(51) Int. Cl.
*C08G 18/30* (2006.01)

(52) U.S. Cl. ............ 521/174; 521/130; 521/131; 521/167; 521/170; 521/172; 521/173; 521/176

(58) Field of Classification Search ............ 521/130, 521/131, 167, 170, 172, 173, 174, 176
See application file for complete search history.

(56) References Cited

U.S. PATENT DOCUMENTS

| | | | |
|---|---|---|---|
| 4,496,625 A * | 1/1985 | Snider et al. | 428/318.4 |
| 5,010,116 A | 4/1991 | Colfati | 521/155 |
| 5,070,115 A | 12/1991 | Welte et al. | 521/173 |
| 5,214,076 A * | 5/1993 | Tideswell et al. | 521/164 |
| 5,260,347 A * | 11/1993 | Krueger et al. | 521/164 |
| 5,420,169 A | 5/1995 | Schumacher et al. | 521/129 |
| 5,627,221 A | 5/1997 | Schumacher et al. | 521/173 |
| 5,840,781 A * | 11/1998 | Dietrich et al. | 521/167 |
| 5,886,062 A * | 3/1999 | Dietrich et al. | 521/167 |
| 6,005,016 A | 12/1999 | Nodelman et al. | 521/164 |

FOREIGN PATENT DOCUMENTS

| | | |
|---|---|---|
| EP | 0 137 489 | 4/1985 |
| EP | 0 600 351 | 6/1994 |

OTHER PUBLICATIONS

Polyurethanes Expo "96 Conference Proceedings, (month unavailable) 1996, pp. 179-189, "Low-Density All Water-Blown Rigid Foam for Pour-in Place Applications", W.A. Kaplan P.L. Neill, L.C. Studte, C.J. Brink.

* cited by examiner

*Primary Examiner*—John M. Cooney, Jr.
(74) *Attorney, Agent, or Firm*—Lyndanne M. Whalen; John E. Mrozinski, Jr.

(57) ABSTRACT

The present invention relates to polyol compositions which can be used to produce dimensionally stable, low density water-blown rigid foams which have acceptable compressive strengths and acceptable k-factors. In one embodiment of the present invention, the polyol compositions are composed of at least one aromatic amine-initiated polyether polyol and at least one polyether polyol having a functionality greater than or equal to 2.5 in which at least 50% by weight of the polyol composition is aromatic amine-initiated polyether polyol and in which no more than 50% by weight of the polyol composition is polyether polyol having a functionality greater than or equal to 2.5.

In another embodiment of the present invention, the polyol compositions are composed of at least one aromatic amine-initiated polyether polyol and at least one polyester polyol in which at least 30% by weight of the polyol composition is aromatic amine-initiated polyether polyol and in which no more than 70% by weight of the polyol composition is polyester polyol.

10 Claims, No Drawings

POLYOL COMPOSITIONS USEFUL FOR PREPARING DIMENSIONALLY STABLE, LOW DENSITY WATER-BLOWN RIGID FOAMS AND THE PROCESSES RELATED THERETO

TECHNICAL FIELD OF THE INVENTION

The present invention relates to polyol compositions which can be used to prepare dimensionally stable, low density water-blown rigid foams having acceptable compressive strength. The present invention also relates to dimensionally stable, low density water-blown rigid foams having acceptable compressive strength produced with the polyol compositions of the present invention. The present invention further relates to processes for preparing dimensionally stable, low density water-blown rigid foams having acceptable compressive strength which are produced with the polyol compositions of the present invention.

BACKGROUND OF THE INVENTION

Rigid polyurethane foams are widely known and are used in numerous industries. Rigid foams can be used, for example, in the construction industry as insulating materials as well as in the manufacture of appliances. Rigid polyurethane foams are produced by reacting a polyisocyanate with a polyol in the presence of a blowing agent. Chlorofluorocarbons (CFC's) were typically used as blowing agents in the production of rigid polyurethane foams. When used in the production of rigid polyurethane foams, CFC's vaporize as a result of the reaction exotherm, thereby causing the reaction mixture to form a foam. CFC's are now believed to contribute to the depletion of ozone in the stratosphere. As a result, mandates have been issued which prohibit the use of CFC's. Effort has therefore been directed to using water as a blowing agent in the production of some rigid polyurethane foams.

There are, however, drawbacks to using water as a blowing agent for producing rigid polyurethane foams. One such drawback is the fact that carbon dioxide gas, which is produced from the reaction between the isocyanate and water, tends to diffuse out of the foam cells, thereby leading to foam shrinkage. As more water is used in production processes, the resulting foams become less dimensionally stable, i.e., the foams shrink upon storage. It is generally recognized in the art that water-blown rigid foams having densities less than 2.4 lbs/ft$^3$ are not dimensionally stable, particularly at elevated temperatures. (See U.S. Pat. No. 5,420,169, column 2, line 25).

In an attempt to alleviate the foregoing problem, several approaches have been taken. One such approach is to produce open-cell rigid polyurethane foams. However, unlike closed-cell water blown foams, open-cell foams are poor insulators. (See W. A. Kaplan et al., *Low-Density All Water-Blown Rigid Foam for Pour-in-Place Applications*, Polyurethanes Expo '96 Conference Proceedings, pp.179-89 (1996)). Alternatively, highly functional, low molecular weight polyols can be used in the production of low density water-blown rigid foams to increase crosslinking density and improve foam strength and reduce shrinkage. However, these foams are generally brittle and tend to have poor adhesion to substrates.

A process for producing a dimensionally stable, low-density water-blown rigid foam is described in U.S. Pat. No. 5,627,221. The foam produced by the process described in this patent has a free rise density less than about 2.5 lbs/ft$^3$ and exhibits less than a 5.5% volume change when stored at 158° F. for twenty-eight days. The polyol mixture used in the process described in this patent is composed of about 50-90 parts by weight of a polyester polyol and about 5-50 parts by weight of a polyether polyol. However, the foams produced by the process disclosed in this patent have low compressive strength. (See Example 1, column 5, lines 51-52).

There remains, therefore, a need for dimensionally stable, low density water-blown rigid foams which have acceptable compressive strength.

SUMMARY OF THE INVENTION

The present invention relates to polyol compositions which can be used to produce dimensionally stable, low density water-blown rigid foams which have acceptable compressive strength. The present invention also relates to dimensionally stable, low density water-blown rigid foams having acceptable compressive strength which are produced with the polyol compositions of the present invention.

The invention further relates to processes for preparing dimensionally stable, low density water-blown rigid foams having acceptable compressive strength by reacting at least one isocyanate with an isocyanate-reactive mixture which is composed of a polyol composition of the present invention, optionally, at least one catalyst, water and, optionally, at least one additive or auxiliary agent.

DESCRIPTION OF THE INVENTION

The invention is directed to polyol compositions which are composed of at least one aromatic amine-initiated polyether polyol and at least one or more of the following: (i) at least one polyether polyol having a functionality equal to or greater than 2.5; and/or (ii) at least one polyester polyol, in which at least 30% by weight of the polyol composition, based on the total weight of the polyol composition, is aromatic amine-initiated polyether polyol and in which, if present, no more than 50% by weight of the polyol composition, based on the total weight of the polyol composition, is polyether polyol having a functionality equal to or greater than 2.5 and/or in which, if present, no more than 70% by weight of the polyol composition, based on the total weight of the polyol composition, is polyester polyol.

The invention is further directed to dimensionally stable, low density water-blown rigid foams having acceptable compressive strength which are prepared with the polyol compositions of the present invention.

The invention is also directed to processes for preparing dimensionally stable, low density water-blown rigid foams having acceptable compressive strength by reacting at least one isocyanate with an isocyanate-reactive mixture which is composed of a polyol composition of the present invention, optionally, at least one catalyst, water and, optionally, at least one additive or auxiliary agent.

In one embodiment of the present invention, the polyol composition is composed of at least one aromatic amine-initiated polyether polyol and at least one polyether polyol having a functionality equal to or greater than 2.5 in which at least 50% by weight of the polyol composition, based on the total weight of the polyol composition, is polyether polyol having a functionality equal to or greater than 2.5 and in which no more than 50% by weight of the polyol composition, based on the total weight of the polyol composition, is polyether polyol having a functionality equal to or greater than 2.5.

Preferably, the polyol composition of this embodiment of the invention is composed of 75% by weight, more preferably, 78% by weight, based on the total weight of the polyol composition, of aromatic amine-initiated polyether polyol and 25% by weight, more preferably, 22% by weight, based on the total weight of the polyol composition, of polyether polyol having a functionality equal to or greater than 2.5.

In another embodiment of the present invention, the polyol composition is composed of at least one aromatic amine-initiated polyether polyol and at least one polyester polyol in which at least 30% by weight of the polyol composition, based on the total weight of the polyol composition, is aromatic amine-initiated polyether polyol and in which no more than 70% by weight of the polyol composition, based on the total weight of the polyol composition, is polyester polyol.

Preferably, the polyol composition of this embodiment of the invention is composed of 40% by weight, more preferably, 75% by weight, based on the total weight of the polyol composition, of aromatic amine-initiated polyether polyol and 60% by weight, more preferably, 25% by weight, based on the total weight of the polyol composition, of polyester polyol.

Aromatic amine-initiated polyether polyols of the present invention are known and are described in, for example, U.S. Pat. Nos. 4,877,879 and 5,786,405. Typically, these polyether polyols are produced by reacting an amine such as, for example, toluenediamine ("TDA"), with an alkylene oxide such as, for example, ethylene oxide or propylene oxide. This reaction may be catalyzed with an alkaline catalyst such as potassium hydroxide.

The amines useful in the practice of the present invention have an amine functionality of at least 1, preferably, within the range of from about 1 to about 3, most preferably, within the range of from about 1 to about 2. Examples of suitable aromatic amines which can be used in the present invention include crude TDA obtained by the nitration of toluene followed by reduction; 2,3-TDA, 3,4-TDA, 2,4-TDA, 2,6-TDA or mixtures thereof; aniline; 4,4'-methylene dianiline; methylene-bridged polyphenyl polyamines composed of isomers of methylene dianilines and triamines or polyamines of higher molecular weight prepared by reacting aniline with formaldehyde by methods known in the art. Preferably, a mixture composed primarily of 2,3-TDA and 3,4-TDA (commonly referred to as "o-TDA") is used.

Any suitable alkylene oxide may be used in the present invention. Examples of alkylene oxides which can be used include ethylene oxide, propylene oxide, butylene oxide, amylene oxide and mixtures thereof. The alkylene oxides may be added individually, sequentially one after the other to form blocks or in a mixture to form a heteric polyether. The polyether polyols may have either primary or secondary hydroxyl end groups. Preferably, polyols used in the present invention are produced by first adding a block of ethylene oxide to the o-TDA, followed by a block of propylene oxide.

Preferably, aromatic amine-initiated polyether polyols having OH numbers greater than 200 and average functionalities greater than 2 are used in the present invention. More preferably, o-TDA-initiated polyether polyols having OH numbers within the range of from about 385 to about 405 and average functionalities of about 4.0 are used.

Any polyether polyol having a functionality greater than or equal to 2.5 known in the art can be used in the present invention. Polyether polyols having a functionality greater than or equal to 2.5 of the present invention can be prepared by known procedures such as by alkoxylating starter compounds. Any suitable alkylene oxide may be used such as ethylene oxide, propylene oxide, butylene oxide, amylene oxide and mixtures of these oxides. Preferably, propylene oxide is used.

Starter compounds which can be used in the present invention include, for example, glycerin, trimethylolpropane, triethanolamine, ethanolamine, pentaerythritol, sucrose, sorbitol, propylene glycol, ethylene glycol, water and mixtures thereof. Preferably, glycerin is used.

Preferably, alkoxylated triols are used in the present invention. Preferred alkoyxlated triols of the present invention have OH numbers within the range of from about 200 to about 500. More preferably, alkoxylated triols having OH numbers within the range of from about 450 to about 490 are used in the present invention.

Any polyester polyol known in the art can be used in the present invention. Polyester polyols useful in the present invention typically have an average functionality within the range of from about 1.8 to about 8, preferably, from about 2 to about 6 and, more preferably, from about 2 to about 2.5; hydroxyl number values within the range of from about 50 to about 500, preferably, from about 200 to about 400 and, more preferably, from about 200 to about 250 mg KOH/g.

Polyester polyols of the present invention can be prepared by known procedures. Polyester polyols of the present invention are typically obtained from polycarboxylic acids and polyhydric alcohols. Suitable polycarboxylic acids which can be used in the present invention include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, .alpha.-hydromuconic acid, .beta.-hydromuconic acid, .alpha.-butyl-.alpha.-ethyl-glutaric acid, .alpha.-,.beta.-diethylsuccinic acid, isophthalic acid, terephthalic acid, phthalic acid, hemimellitic acid and 1,4-cyclohexanedicarboxylic acid. Terephthalic acid is preferably used.

Suitable polyhydric alcohols which can be used to produce suitable polyester polyols used in the present invention include ethylene glycol, propylene glycol, dipropylene glycol, trimethylene glycol, 1,2-butanediol, 1,4-butanediol, 1,5-pentanediol, 1,6-hexanediol, 1,7-heptanediol, hydroquinone, resorcinol, glycerine, 1,1,1-trimethylol-propane, 1,1,1-trimethylolethane, pentaerythritol, 1,2,6-hexanetriol, .alpha.-methyl glucoside, sucrose and sorbitol. Ethylene glycol is preferably used.

The invention is also directed to a process for preparing dimensionally stable, low density water-blown rigid foams having acceptable compressive strength by reacting at least one isocyanate with an isocyanate-reactive mixture which is composed of a polyol composition of the present invention, optionally, at least one catalyst, water and, optionally, at least one additive or auxiliary agent. Preferably, at least 80% by weight, more preferably, at least 90% by weight, based on the total weight of the isocyanate-reactive mixture, of the polyol composition is used.

Optionally, any catalysts known in the art can be used in the present invention either alone or with one other catalyst or with multiple catalysts. Examples of catalysts which can be used in the present invention include, for example, tin(II) salts of carboxylic acids; dialkyl tin salts of carboxylic acids; dialkyl tin mercaptides; dialkyl tin dithioesters; bis-dimethylaminoethyl ethers; dimethyl benzylamines; tetramethylethylenediamines (TMEDA); dimethylaminodiglycols; dimethyldiglykolamins; sodium N-(2-hydroxy-5-nonyl phenyl) methyl-N-methylglycinates; tertiary amines, such as, for example, dimethylcyclohexylamines; and catalyst blends composed of tertiary amines and surfactants which promote the water/isocyanate reaction such as, for example, NIAX A-4, which is commercially available from OSi-Witco Chemical Corporation.

Preferably, TMEDA and dimethyl benzylamine are both used as catalysts in the present invention. If used, catalysts can be present in an amount within the range of from about 0.1 to about 5% by weight each, preferably, within the range of from about 0.1 to about 1.0% by weight each, more preferably, within the range of from about 0.2 to about 0.9% by weight each, based on the total weight of the isocyanate-reactive mixture.

Water is used as the blowing agent in the present invention. Although it is preferred to use water as the sole blowing agent in the present invention, auxiliary blowing agents, such as, for example, carbon dioxide, can be used. Water can be used in an amount up to about 10% by weight. Preferably, about 2-8% by weight, more preferably, about 3-6% by weight, based on the total weight of the isocyanate-reactive mixture, of water is used in the present invention.

Any surfactants known in the art can be used in the present invention. Surfactants which can be used in the present invention include polyether siloxanes. The structure of these compounds is generally such that a copolymer of ethylene oxide and propylene oxide is attached to a polydimethyl siloxane radical. Such foam stabilizers are described in U.S. Pat. No. 2,764,565.

Preferably, silicon surfactants suitable for rigid polyurethane foams are used in the present invention. Examples of surfactants which can be used in the present invention include, for example, TEGOSTAB B 8404, available commercially from Goldschmidt, Essen, Germany and L-6900 and L-5440, both of which are available commercially from OSi Specialties.

Surfactants can be used in the present invention in amounts of from about 0.3 to about 3% by weight, preferably, in amounts of from about 0.5 to about 2% by weight, based on the total weight of the isocyanate-reactive mixture.

In addition to surface-active agents, other known additives can be used in the present invention, including, for example, internal mold release agents; pigments; cell regulators; flame retarding agents; plasticizers; dyes; and fillers, all of which are known in the art. Known reinforcing agents such as, for example, glass in the form of fibers or flakes or carbon fibers can also be used.

Any isocyanate known in the art can used in the present invention. Preferably, polymeric diphenylmethane diisocyanates having NCO group contents of about 31.5%, functionalities of about 2.8 and viscosities of about 196 mPa.s at 25° C. are used Isocyanates useful in the present invention are typically used in an amount such that the isocyanate index is within the range of from about 80 to about 130, preferably, within the range of from about 95 to about 110. The term "Isocyanate Index" (also commonly referred to as "NCO index"), is defined herein as the equivalent of isocyanate, divided by the total equivalent of isocyanate-reactive hydrogen containing materials, multiplied by 100. When water is present as the blowing agent, the quantity of water present is considered in calculating the isocyanate index.

The present invention is also directed to dimensionally stable, low density water-blown rigid foams having acceptable compressive strengths prepared by reacting at least one isocyanate with an isocyanate-reactive mixture which is composed of a polyol composition of the present invention, optionally, at least one catalyst, water and, optionally, at least one additive or auxiliary agent.

Foams produced according to the present invention typically have densities less than about 15 lbs/ft$^3$. Preferably, foams produced according to the present invention have densities within the range of from about 1 to about 3 lbs/ft$^3$. Foams produced according to the present invention typically have less than about a 10% volume change, preferably, less than about a 5% volume change, more preferably, less than about a 1% volume change, as measured by ASTM D-2126, after storage at elevated temperatures. Foams produced according to the present invention typically have compressive strengths within the range of from about 15 to about 150 lb/in$^2$, preferably, within the range of from about 35 to about 50 lb/in$^2$.

Dimensionally stable, water-blown rigid foams of the present invention have acceptable k-factors. "K-factor" is a measurement of the thermal conductivity of the insulating material, i.e., the rigid polyurethane foam. The lower the k-factor of the rigid foam the better its insulating properties. For insulating foams, the object is to retain the blowing agent in the cells to maintain the low k-factor. Thus, less open-cell content in the foam is desirable.

Foams produced according to the present invention typically have k-factors less than 0.2 British Thermal Units (BTU) (inch/° F. ft$^2$ hr). Preferably, foams produced according to the present invention have k-factors less than about 0.17 BTU. Additionally, foams produced according to the present invention typically have more than a 50% closed-cell content, preferably, more than an 80% closed-cell content.

Dimensionally stable, low density water-blown rigid foams of the present invention are particularly useful in applications which do not have stringent insulation requirements as well as in non-k factor critical applications such as, for example, as intermediate layers for sandwich elements or for foam-filling items such as picnic coolers, vending machines, entry or garage doors, water heaters and flotation devices.

The following examples merely illustrate the invention. Those skilled in the art will recognize many variations that are within the spirit of the invention and scope of the claims.

EXAMPLES

The following compounds were used in the examples:

| | |
|---|---|
| Polyol A: | an o-TDA-initiated polyether polyol having an OH number of about 395 and an average functionality of about 4.0; |
| Polyol B: | a propoxylated triol based on glycerine and having an OH number of about 470; |
| Polyol C: | a modified diethylene glycol phthalate polyester polyol having an OH value of from 230-250; |
| Polyol D: | a polyether polyol based on ethylene diamine and propylene oxide having an OH number of 630 and an average functionality of 4.0; |
| Polyol E: | a polyether polyol prepared from sucrose and propylene oxide an having an OH number of from 370 to 390 and an average functionality of 5.8; |
| Polyol F: | a triethanolamine initiated polyether polyol having an OH number of 150 and an average functionality of 3.0; |
| Catalyst A: | TMEDA; |
| Catalyst B: | dimethyl benzylamine; |
| Catalyst C: | dimethylaminodiglycol; |
| Catalyst D: | bis-dimethylaminoethyl ether; |
| Catalyst E: | dimethylcyclohexylamine; |
| Catalyst F: | sodium N-(2-hydroxy-5-nonyl phenyl) methyl-N-methylglycinate; |

-continued

| | |
|---|---|
| Catalyst G: | NIAX A-4, a catalyst blend composed of a tertiary amine and surfactant which is commercially available from OSi, a division of Witco Chemical Corporation; |
| Surfactant A: | L-5440 which is available commercially from OSi, a division of Witco Chemical Corporation; |
| Surfactant B: | TEGOSTAB B 8404 which is available commercially from Goldschmidt; |
| Surfactant C: | L-6900 which is available commercially from OSi, a division of Witco Chemical Corporation; |
| Flame Retardant: | tri(B-chloropropyl) phosphate; and |
| Isocyanate A: | a polymeric diphenylmethane diisocyanate having an NCO group content of about 31.5%, a functionality of about 2.8 and a viscosity of about 196 mPa · s at 25° C. |

Example 1

A low density water-blown rigid foam was prepared using a polyol composition composed of:
a) 78% by weight of Polyol A; and
b) 22% by weight of Polyol B.

91% by weight of the polyol composition was combined with: i) 0.69% by weight Catalyst A; ii) 0.69% by weight Catalyst B; iii) 1.97% by weight Surfactant A; and iv) 6.11% by weight water to form an isocyanate-reactive mixture. A 22×13×2" aluminum mold was treated with paste wax as a mold release agent and placed in a press with heated platens. The mold was then heated to 54° C. Both Isocyanate A as well as the isocyanate-reactive mixture were allowed to equilibrate to 20° C. The isocyanate-reactive mixture was then hand-mixed with Isocyanate A at a ratio of 189.83 grams of Isocyanate A/100 grams of isocyanate-reactive mixture and then poured into the aluminum mold. The mold configuration gave a vertical rising foam. The mold was first left open at the top and over-filled to determine minimum fill density by cutting the sample down to known dimensions and determining the mass. After the minimum fill density was determined, the mold was clamped closed and packed to a density of 15% over the minimum fill density. The sample was de-molded after 120 seconds. After foam was aged for twenty-four hours it was submitted for physical and thermal testing.

Example 2

A low density water-blown rigid foam prepared with a polyol composition composed of:
a) 40% by weight Polyol A; and
b) 60% by weight of Polyol C.

92.93% by weight of the polyol composition was combined with: i) 0.56% by weight Catalyst E; ii) 1.86% by weight Surfactant C; and iii) 4.65 by weight water to form an isocyanate-reactive mixture. A 14×14×2.5" aluminum mold was treated with paste wax as a mold release agent and pre-heated to 40° C. in a convection oven. The isocyanate-reactive mixture was charged to the B-side pot on an LK-06 low pressure urethane processing machine from Hennecke Machinery. Isocyanate A was charged to the A-side pot. Both Isocyanate A and the isocyanate-reactive mixture were allowed to equilibrate to the 25° C. temperature in the tanks. Processing pressure of Isocyanate A and the isocyanate-reactive mixture were both set at 200 psi. Isocyanate A was then mixed with the isocyanate-reactive mixture at a ratio of 149.8 grams of Isocyanate A/100 grams of isocyanate-reactive mixture and then poured into the aluminum mold. The mold configuration gave a vertical rising foam. The mold was first left open at the top and over-filled to determine minimum fill density by cutting the sample down to known dimensions and determining the mass. After the minimum fill density was determined, the mold was clamped closed and packed to a density of 15% over the minimum fill density. The sample was de-molded after 600 seconds and submitted for physical and thermal testing.

Example 3

A low density water-blown rigid foam prepared with a polyol composition composed of:
a) 75% by weight of Polyol A; and
b) 25% by weight of Polyol C.

84.8% by weight of the polyol composition was combined with: i) 0.94% by weight Catalyst C; ii) 0.22% by weight Catalyst D; iii) 0.22% by weight Catalyst E; iv) 0.45% by weight Catalyst F; v) 1.78% by weight Surfactant B; vi) 5.35% by weight flame retardant; and vii) 6.25% by weight water to form an isocyanate-reactive mixture. A 22×13×2" aluminum mold was treated with paste wax as a mold release agent and placed in a press with heated platens. The mold was then heated to 54° C. Both Isocyanate A and the isocyanate-reactive mixture were allowed to equilibrate to the 20° C. temperature. Isocyanate A was then hand-mixed with the isocyanate-reactive mixture at a ratio of 172.9 grams of Isocyanate A/100 grams of isocyanate-reactive mixture and then poured into the aluminum mold. The mold configuration gave a vertical rising foam. The mold was first left open at the top and over-filled to determine minimum fill density by cutting the sample down to known dimensions and determining the mass. After the minimum fill density was determined, the mold was clamped closed and packed to a density of 15% over the minimum fill density. The sample was de-molded after 120 seconds. After foam was aged for twenty-four hours it was submitted for physical and thermal testing.

Example 4 (Comparison)

A low density water-blown rigid foam prepared with a polyol composition composed of:
a) 9% by weight of Polyol D;
b) 48% by weight of Polyol E; and
c) 43% parts by weight of Polyol F.

93.91% by weight of the polyol composition was combined with: i) 0.3% by weight Catalyst G; ii) 1.75% by weight Surfactant C; and iii) 4.04 by weight water to form an isocyanate-reactive mixture. A 14×14×2.5" aluminum mold was treated with paste wax as a mold release agent and pre-heated to 40° C. in a convection oven. The isocyanate-reactive mixture was charged to the B-side pot on an LK-06 low pressure urethane processing machine from Hennecke Machinery. Isocyanate A was charged to the A-side pot. Both Isocyanate A and the isocyanate-reactive mixture were allowed to equilibrate to the 30° C. temperature in the tanks. Processing pressure of Isocyanate A and the isocyanate-reactive mixture were both set at 175 psi. Isocyanate A was then mixed with the isocyanate-reactive mixture at a ratio of 140.6 grams of Isocyanate A/100 grams of isocyanate-reactive mixture and then poured into the aluminum mold. The mold configuration gave a vertical rising foam. The mold was first left open at the top and over-filled to determine minimum fill density by cutting the sample down to known dimensions and determining the mass. After the minimum fill density was determined, the mold was clamped closed and packed to a density of 15% over the minimum fill density. The sample was de-molded after 600 seconds and submitted for physical and thermal testing.

Example 5 (Comparison):

A low density water-blown rigid foam was prepared using a polyol composition composed of:
 a) 25% by weight Polyol A; and
 b) 75% by weight Polyol C.

84.8% by weight of the polyol composition was combined with: i) 0.94% by weight Catalyst C; ii) 0.22% by weight Catalyst D; iii) 0.22% by weight Catalyst E; iv) 0.45% by weight Catalyst F; v) 1.78% by weight Surfactant B; vi) 5.35% by weight flame retardant; and vii) 6.25% by weight water, to form an isocyanate-reactive mixture. A 22×13×2" aluminum mold was treated with paste wax as a mold release agent and placed in a press with heated platens. The mold was then heated to 54° C. Both Isocyanate A and the isocyanate-reactive mixture were allowed to equilibrate to 20° C. Isocyanate A was then hand-mixed with the isocyanate-reactive mixture at a ratio of 157.2 grams of Isocyanate A/100 grams of isocyanate-reactive mixture and then poured into the aluminum mold. The mold configuration gave a vertical rising foam. The mold was first left open at the top and over-filled to determine minimum fill density by cutting the sample down to known dimensions and determining the mass. After the minimum fill density was determined, the mold was clamped closed and packed to a density of 15% over the minimum fill density. The sample was de-molded after 120 seconds. After foam was aged for twenty-four hours it was submitted for physical and thermal testing.

The foams produced in the foregoing examples were tested according to the following test methods:
 Molded Density: ASTM D-1622
 Compressive Strength: ASTM D-1621
 Dimensional Stability (% Volume Change): ASTM D-2126

TABLE 1

Properties of Foams Prepared in Examples 1-5:

|  | Example 1 | Example 2 | Example 3 | Example 4 (comparison) | Example 5 (comparison) |
|---|---|---|---|---|---|
| Molded Density (lbs/ft$^3$) | 2.00 at 15% overpack | 2.37 at 15% overpack | 1.86 at 15% overpack | 2.28 at 15% overpack | 1.76 at 15% overpack |
| Compressive strength |  |  |  |  |  |
| parallel (lbs/in$^2$) | 41.16 | 39.7 | 41.3 | 31.4 | 27.6 |
| perpendicular (lbs/in$^2$) | 22.92 | 19.0 | 19.2 | 9.4 | 16.6 |
| Dimensional stability |  |  |  |  |  |
| 24 hours @ 100° C., ambient humidity (% vol. change) | −1.7 |  | −3.9 |  | −31.6 |
| 24 hours @ 70° C., 100% relative humidity (% vol. change) | −0.1 | −1.1 |  | −12.5 |  |

Example 1 shows that a low density water-blown rigid foam produced with a polyol composition composed of 78% by weight of an aromatic amine-initiated polyether polyol and 22% by weight of an alkoxylated triol exhibits excellent compressive strength and is dimensionally stable. The foam prepared according to Example 1 was tested for k-factor utilizing a Lasercomp Fox 200 heat flow meter. The foam produced according to Example 1 had a k-factor of 0.161 BTU. The foam prepared according to Example 1 was also tested for % open/closed cell content utilizing a Quantachrome pycnometer. The foam produced according to Example 1 had an 89% closed-cell content.

Example 2 shows that a low density water-blown rigid foam produced with a polyol composition composed of 40% by weight of an aromatic amine-initiated polyether polyol and 60% by weight of a polyester polyol exhibits excellent compressive strength and is dimensionally stable. The foam prepared according to Example 2 was tested for k-factor utilizing a Lasercomp Fox 200 heat flow meter. The foam produced according to Example 2 had a k-factor of 0.166 BTU's. The foam prepared according to Example 2 was tested for % open/closed cell content utilizing a Quantachrome pycnometer. The foam produced according to Example 2 had an 86% closed-cell content.

Example 3 shows that a low density water-blown rigid foam produced with a polyol composition composed of 75% by weight of an aromatic amine-initiated polyether polyol and 25% by weight of a polyester polyol exhibits excellent compressive strength and is dimensionally stable.

Comparison Example 4 shows that a low density water-blown rigid foam produced with a polyol composition which does not contain an aromatic amine-initiated polyether polyol does not exhibit excellent compressive strength and is not dimensionally stable. The foam prepared according to Comparison Example 4 was tested for k-factor utilizing a Lasercomp Fox 200 heat flow meter. The foam produced by Comparison Example 4 had a k-factor of 0.168 BTU. The foam prepared according to Comparison Example 4 was tested for % open/closed cell content utilizing a Quantachrome pycnometer. The foam produced according to Comparison Example 4 had an 86% closed-cell content.

Comparison Example 5 shows that a low density water-blown rigid foam produced with a polyol composition composed of less than 30% by weight of an aromatic amine-initiated polyether polyol and more than 70% by weight of a polyester polyol does not exhibit excellent compressive strength and is not dimensionally stable.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a low density, solely water-blown rigid polyurethane foam consisting of reacting:
   (1) a polyol composition composed of:
      1.) at least 30% by weight, based on the total weight of the polyol composition, of at least one aromatic amine-initiated polyether polyol having a hydroxyl number of from greater than 200 to about 405; and
      2.) at least one of the following:
         (i) up to 50% by weight, based on the total weight of the polyol composition of a polyether polyol having a functionality greater than or equal to 2.5 which is different from the polyether polyol of 1.); and
         (ii) up to 70% by weight, based on the total weight of the polyol composition, of a polyester polyol; with
   (2) at least one isocyanate; in the presence of
   (3) optionally, at least one catalyst;
   (4) water; and
   (5) optionally, at least one additive or auxiliary agent selected from internal mold release agents, pigments, cell regulators, flame retarding agents, plasticizers, dyes, fillers or reinforcing agents
   wherein the low density, solely water-blown rigid polyurethane foam produced has a closed cell content of at least 80%.

2. The process of claim 1 in which 78% by weight of the polyol composition, based on the total weight of the polyol composition, is aromatic amine-initiated polyether polyol and in which 22% by weight of the polyol composition, based on the total weight of the polyol composition, is polyether polyol having a functionality greater than or equal to 2.5.

3. The process of claim 1 in which 40% by weight of the polyol composition, based on the total weight of the polyol composition, is aromatic amine-initiated polyether polyol and in which 60% by weight, based on the total weight of the polyol composition, is polyester polyol.

4. The process of claim 1 in which 75% by weight of the polyol composition, based on the total weight of the polyol composition, is aromatic amine-initiated polyether polyol and in which 25% by weight, based on the total weight of the polyol composition, is polyester polyol.

5. The process of claim 1 in which the aromatic amine-initiated polyether polyol is produced with o-toluenediamine as a starter.

6. A low density, solely water-blown rigid polyurethane foam produced by reacting:
   (1) a polyol composition composed of:
      1.) at least 30% by weight, based on the total weight of the polyol composition, of at least one aromatic amine-initiated polyether polyol having a hydroxyl number of from areater than about 200to about 405; and
      2.) at least one of the following:
         (i) up to 50% by weight, based on the total weight of the polyol composition of a polyether polyol having a functionality greater than or equal to 2.5 which is different from the polyether polyol of 1.); and
         (ii) up to 70% by weight, based on the total weight of the polyol composition, of a polyester polyol; with
   (2) at least one isocyanate; in the presence of
   (3) optionally, at least one catalyst;
   (4) water; and
   (5) optionally, at least one additive or auxiliary agent selectedJrom internal mold release agents, pigments, cell regulators, flame retarding agents, plasticizers, dyes, fillers or reinforcing agents
   wherein the low density, solely water-blown rigid polyurethane foam produced has a closed cell content of at least 80%.

7. The foam of claim 6 which has a density of from about 1 to about 3.0 lbs/ft$^3$.

8. The foam of claim 6 which exhibits less than a 10% volume change when stored at 100° C. and at ambient humidity for twenty-four hours.

9. The foam of claim 6 which exhibits less than a 10% volume change when stored at 70° C. and at 100% relative humidity for twenty-four hours.

10. The foam of claim 6 which has a parallel compressive strength within the range of from about 35 to about 50 lbs/in$^2$.

* * * * *